(12) United States Patent
Grimme et al.

(10) Patent No.: US 6,267,206 B1
(45) Date of Patent: Jul. 31, 2001

(54) BRAKE LINING FOR DISK BRAKES

(75) Inventors: Hansjörg Grimme, Glinde; Karsten Fischer, Hamburg, both of (DE)

(73) Assignee: AlliedSignal Bremsbelag GmbH, Glinde (DE)

(*) Notice: Subject to any disclaimer, the term of this patent is extended or adjusted under 35 U.S.C. 154(b) by 0 days.

(21) Appl. No.: 09/451,138

(22) Filed: Nov. 30, 1999

(30) Foreign Application Priority Data

Dec. 2, 1998 (DE) .......................................... 298 21 482 U

(51) Int. Cl.[7] .......................... B61H 7/00; F16D 65/092; F16D 55/225; F16D 69/00
(52) U.S. Cl. ................ 188/73.1; 188/251 A; 188/250 R; 188/250 G; 188/250 B; 188/234
(58) Field of Search ............................... 188/73.1, 250 B, 188/250 G, 251 A, 251 R, 247, 73.2, 234, 73.37, 250 R; 192/107 M; 428/409, 327, 702, 443, 331, 404

(56) References Cited

U.S. PATENT DOCUMENTS

| | | |
|---|---|---|
| 4,173,681 | 11/1979 | Durrieu et al. |
| 4,552,252 * | 11/1985 | Stahl ................................ 188/73.1 |
| 4,781,275 * | 11/1988 | Olsen ................................ 188/251 A |
| 6,062,351 * | 5/2000 | Strasser et al. .................. 188/251 A |

FOREIGN PATENT DOCUMENTS

| | | |
|---|---|---|
| 1575930 | 5/1970 | (DE) . |
| 29821482 * | 5/2000 | (DE) . |
| 0027714 * | 4/1981 | (EP) . |
| 2441100 | 6/1980 | (FR) . |
| 2498713 | 7/1982 | (FR) . |
| 2508129 | 12/1982 | (FR) . |
| 2259553 | 3/1993 | (GB) . |

* cited by examiner

Primary Examiner—Douglas C. Butler
(74) Attorney, Agent, or Firm—Friedrich Kueffner

(57) ABSTRACT

The brake lining (100) for disk brakes comprises a carrier plate (10) and a friction material block (20) fixed thereon made of a pressed friction material, the friction material block (20) being fixed positively and/or nonpositively on the carrier plate (10), the carrier plate (10) being made of a hard amorphous plastic rigid up to the decomposition temperature which is composed of spatially close meshed interlaced macromolecules with a high mechanical strength like for example a duroplastic, the material of the carrier plate (10) gripping into the carrier plate free surface (20a) of the friction material block (20) and overlapping the side walls (21, 22, 23) of the friction material block (20) placed on the carrier plate (10) and being welded with the material of the friction material block (20).

12 Claims, 1 Drawing Sheet though not illustrated embodiment, the rear side 10a of the carrier plate 10 can be configured in a geometrically heterogeneous form, namely with inclinations or recesses/ raised parts/indentations 25 etc. which are made of the same material of which the carrier plate is made. It is also possible to integrate materials with another density into the material of the carrier plate 10 or to provide inserts 26 in order to influence the noise behaviour. The carrier plate 10 and the moulding 25 are made of the same materials.

BRAKE LINING FOR DISK BRAKES

BACKGROUND OF THE INVENTION

1. Field of the Invention

The invention relates to a brake lining for disk brakes in particular, for road and rail vehicles, which comprises a carrier plate and a block fixed thereon made of pressed friction material, the friction material block being fixed positively and/or nonpositively on the carrier plate.

2. Description of the Related Art

The most various types of brake linings for disk brakes are known. However, it is common to all these brake linings that a block made of a friction material is placed on a metallic carrier plate. Since the carrier sheets are made of metallic materials, they show a high weight and have furthermore a high heat transition.

SUMMARY OF THE INVENTION

The aim of this invention is to create a brake lining of the above mentioned type, the carrier plate of which has a low weight and a low heat transition for a high mechanical strength, the material of the carrier plate being simultaneously integrated into the material of the friction material block during the manufacturing of the brake lining.

This aim is achieved for a brake lining wherein the carrier plate is made of a hard amorphous plastic rigid up to the decomposition temperature and is composed of spatially close meshed interlaced macromolecules with a high mechanical strength like, for example, a duroplastic, the material of the carrier plate gripping into the carrier plate free surface of the friction material block and overlapping the side walls of the friction material block placed on the carrier plate and being welded with the material of the friction material block.

Accordingly, the invention consists of a carrier plate for such a brake lining made of a hard amorphous plastic rigid up to the decomposition temperature which is composed of spatially close meshed interlaced macromolecules with a high mechanical strength. Preferably the carrier plate is made of a duroplastic. The material of the carrier plate penetrates into the material of the friction material block during the carrier plate manufacturing in the edge areas and bearing areas of the plastic material of the friction material block and furthermore overlaps the side walls of the friction material block placed on the carrier plate so that the material of the carrier plate is more or less welded with the material of the friction material block and thus the friction material block is integrated into the carrier plate material.

Surprisingly it turned out that duroplastics are particularly advantageously suitable as carrier plate material because of their high strength. In addition, there is the low weight and the low heat carrying capacity. Hereby, it is particularly advantageous that the material of the carrying plate during its manufacturing, for example during the injection moulding process, penetrates into the material of the friction material block especially into its side wall areas and is more or less welded here so that the friction material block is simultaneously held locked positively and nonpositively on the carrier plate and is connected with this plate, all the more the material of the carrier plate also engages in the bearing area of the friction material block into its material.

Embodiments of the invention are indicated in the subclaims.

BRIEF DESCRIPTION OF THE DRAWINGS

Advantageous configurations of the invention are represented in the drawings.

DESCRIPTION OF THE PREFERRED EMBODIMENTS

Figure 1:
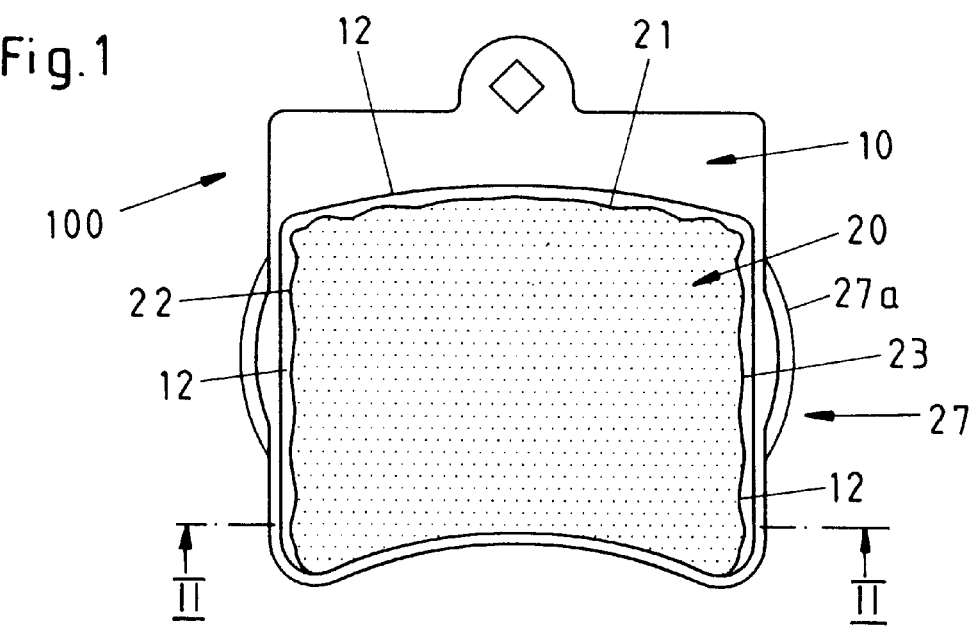
FIG. 1 shows a top view of the brake lining made of a carrier plate and a friction material block.
Figure 2:
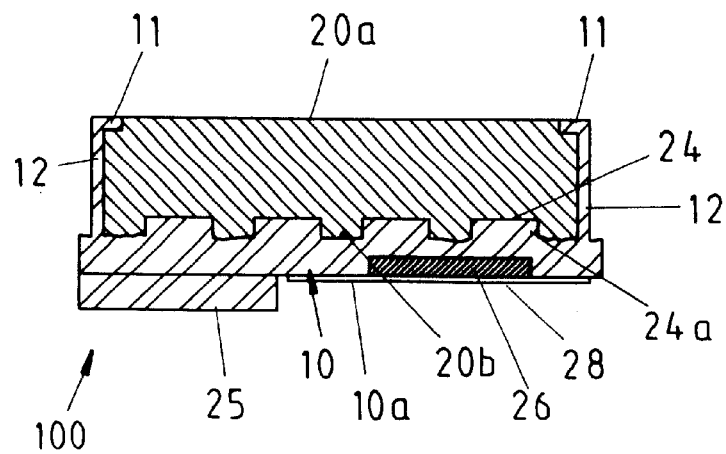
FIG. 2 shows an enlarged vertical section according to line II—II in FIG. 1 of a further embodiment.

The brake lining 100 for disk brakes, especially for road vehicles and rail vehicles, comprises, according to FIG. 1 and 2, a block 20 made of a friction material integrated into a carrier plate 10 made of a duroplastic. During the manufacturing of the brake lining 100, for example during the injection moulding process, the carrier plate 10 is formed and set on one of the two sides of the friction material block 20. The friction material block 20 is not fixed on the carrier plate 10 which is manufactured in a separate operating cycle. The friction material block is more or less encased when manufacturing the carrier plate 10 so that the side walls, especially three connected side walls 21, 22, 23 of the friction material block 20 are encompassed by the material of the carrier plate 10 (FIG. 1). The side walls 21, 22, 23 of the friction material block 20 are then surrounded by side walls 12 which are formed during the manufacturing of the carrier plate 10. Thereby the material of the carrier plate 10 which overlaps the side walls 21, 22, 23 of the friction material block 20 can be guided as far as into the edge area of the carrier plate free surface 20a of the friction material block 20 and can be here welded with the material of the friction material block and these overlapping material sections are indicated by 11 (FIG. 2). The material of the carrier plate 10 which overlaps the side walls 21, 22, 23 of the friction material block 20, sinters more or less into the material of the friction material block 20 so that an intimate compound develops between the material of the carrier plate 10 and the material of the friction material block 20.

In particular phenolic plastics or aminoplastics are used as duroplastics for the manufacturing of the carrier plate 10, whereby raw materials or raw material mixtures interlacing through polyaddition or polymerisation like epoxy resins and non plasticized resins and polyurethane product systems can be used.

The friction material block 20 can be provided on the lower side 20b with recesses 24 which are then filled with the material 24a of the carrier plate 10. Thus the material of the carrier plate 10 grips into the material of the friction material block 20 and sinters exactly into the material of the friction material block 20 so that an intimate compound is developed.

As a measure for influencing the noise behaviour, i.e. for influencing the natural frequency of the whole component—friction lining block 20 and carrier plate 10—the rear side 10a of the carrier plate 10 can be configured in a geometrically heterogeneous form, namely with inclinations or recesses/ raised parts/indentations 25 etc. which are made of the same material of which the carrier plate is made. It is also possible to integrate materials with another density into the material of the carrier plate 10 or to provide inserts 26 in order to influence the noise behaviour. The carrier plate 10 and the moulding 25 are made of the same materials.

Inserts 27a, for example of metal in the carrier plate 10, can support the mechanical properties of the duroplastic material in the areas in which mechanical properties are particularly important, for example in guiding surfaces 27 or contact areas of the brake piston. The inserts 27a can have the most different geometries.

For the mechanical decoupling between the brake lining/ carrier plate and the brake (brake piston), in a further operating cycle, a separating layer 28, for example made of an elastomer, can be applied directly onto the carrier plate. After having applied a bonding agent, the elastomer is applied and is form-fitted onto the carrier plate 10, for example by injection moulding. The separating layer 28 can also be applied onto the raised part 25 and into the recesses on the rear side 10a of the carrier plate 10 (which is not represented).

What is claimed is:

1. A brake lining (100) for brake disk brakes, wherein the brake lining comprises a carrier plate (10) and a block (20) fixed thereon made of pressed friction material, the friction material block (20) being fixed positively and/or nonpositively on the carrier plate (10), wherein the friction material block has a carrier plate free surface and side walls, wherein the carrier plate (10) is made of a hard amorphous plastic rigid up to a decomposition temperature of the hard amorphous plastic, wherein the hard amorphous plastic is composed of spatially close meshed interlaced macromolecules with a high mechanical strength, the material of the carrier plate (10) gripping into the carrier plate free surface (20a) of the friction material block and overlapping the side walls (21, 22, 23) of the friction material block (20) placed on the carrier plate (10) and being welded with the material of the friction material block (20).

2. A brake lining according to claim 1, wherein the carrier plate (10) is injected by injection moulding onto the friction material block (20) during the simultaneous encasing of the side walls (21, 22, 23) of the friction material block (20).

3. A brake lining according to claim 1, wherein the material of the carrier plate (10) is melted down into the material of the friction block also in a surface area of the friction material block (20).

4. A brake lining according to claim 3, wherein the material overlapping the side walls (21, 22, 23) of the friction material block (20) is melted down.

5. A brake lining according to claim 1, wherein the friction material (20) has a lower side (20b) turned to the carrier plate (10), wherein the lower side (20b) has at least one of tapers and recesses for receiving the material (24a) of the carrier plate (10).

6. A brake lining according to claim 1, wherein the friction material (20) has a lower side (20b) turned to the carrier plate (10), wherein the lower side (20b) has a profile shaping made of slits, grooves or flutes for receiving the material (24a) of the carrier plate (10).

7. A brake lining according to claim 1, wherein the carrier plate (10) has a rear side (10a) turned away from the friction material (20), wherein the rear side (10a) has at least one of recesses and raised parts (25).

8. A brake lining according to claim 1, wherein the carrier plate (10) has a rear side (10a) turned away from the friction material (20), wherein the rear side (10a) has a profile shaping made of at least one of recesses and raised parts.

9. A brake lining according to claim 1, wherein the carrier plate (10) has at least one of at least one intermediate layer (26) and an area with a material density different from the residual material of the carrier plate (10).

10. A brake lining according to claim 1, wherein the carrier plate (10) is provided with at least one insert (27a) on one area which is more stressed mechanically.

11. A brake lining according to claim 1, wherein the carrier plate (10) has a rear side (10a) turned away from the friction material (20) and has a separating layer (28) on the rear side.

12. A brake lining according to claim 1, wherein the amorphous hard plastic is a duroplastic.

* * * * *